Dec. 30, 1969  S. D. ALLEN ET AL  3,486,966
CLOTH BALLISTIC PENETRATING RESISTANCE LAMINATE
Filed July 6, 1965
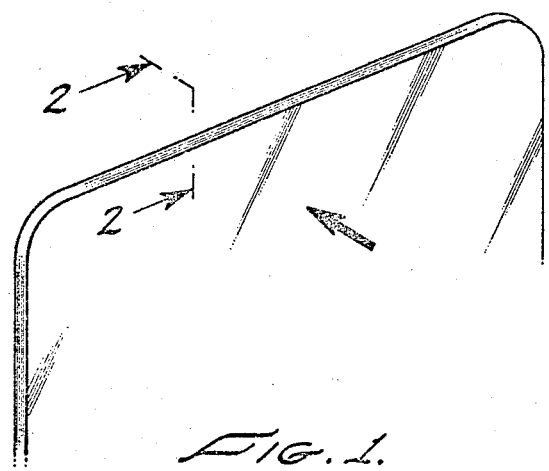
FIG. 1.
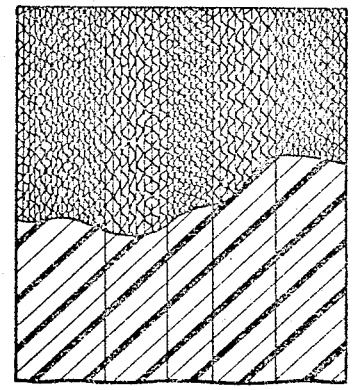
FIG. 2.
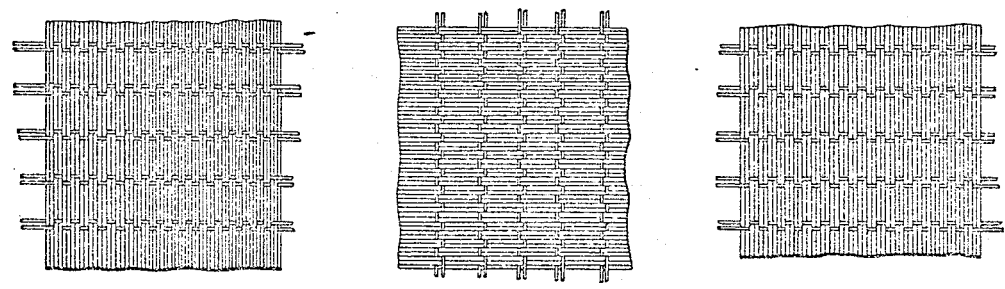
FIG. 3.
FIG. 4.
FIG. 5.
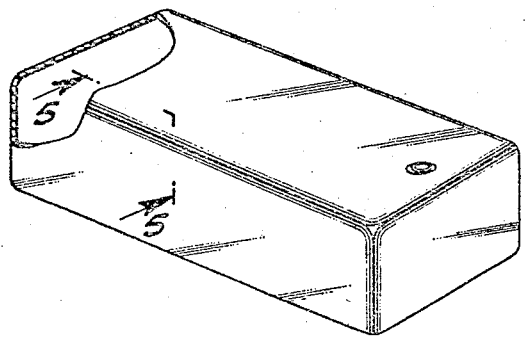
YASH R. SNIDER
SIMON D. ALLEN
INVENTORS
BY Beehler & Arant
John J. Hall
ATTORNEYS 3,486,966
CLOTH BALLISTIC PENETRATING RESISTANCE LAMINATE
Simon D. Allen, La Mirada, and Yash R. Snider, Van Nuys, Calif., assignors to Chem Seal Corporation of America, a corporation of California
Filed July 6, 1965, Ser. No. 469,576
Int. Cl. B32b 5/12, 27/40; D03d 13/00
U.S. Cl. 161—57   6 Claims

ABSTRACT OF THE DISCLOSURE

A light weight ballistic panel including alternate laminations of glass fiber cloth and nylon cloth, the laminations each containing a plurality of layers of cloth, alternate layers of glass fiber cloth being placed with the majority of their fibers oriented at 90 degrees with respect to the preceding layer, and a cured urethane resin bonding the panel together.

---

This invention relates to new laminated plastic panels having great resistance to ballistic penetration and, when formed into fuel tanks, resist instantaneous rupture upon impact.

At the present time, there is a constantly increasing use of commercial airplanes by the general public. As a consequence, more incidents are occurring of passengers shooting at the airplane's crew, particularly at the pilot, through bulkheads or doors which separate the crew's compartment from the passenger's compartment of the airplane.

To protect the airplane's crew, bullet resistant panels may be incorporated into bulkheads or doors separating the crew from the passengers. However, conventional panels must be made of steel or other heavy materials to be of any protection to the crew, and such materials are too heavy for practical use on commercial airplanes. On the other hand, lightweight metals such as aluminum and the like are unable to resist ballistic penetration.

Further, all types of aircraft, particularly helicopters, need fuel tanks which are resistant to instantaneous rupture for a short period of time after a crash to prevent scattering of fuel throughout the airplane body and consequent fire therein. Experience has shown that a short delay of rupture of a fuel tank after an aircraft crashes, for even a few seconds, is of great benefit to both the passengers and crew by preventing wide scattering of fuel and later burning of the fuel throughout the interior of the aircraft.

Conventional fuel tanks for aircraft and particularly helicopters, must be built of materials which are too heavy for use in aircraft in the amounts required before any appreciable effect is produced of prevention of instantaneous rupture.

It is, therefore, an object of our invention to provide a relatively lightweight laminated panel which is resistant to penetration by bullets.

Another object of our invention is to provide a relatively lightweight panel which will prevent penetration of it by bullets of the 44 caliber magnum type at distances as close as 4 to 5 feet.

A further object of our invention is to provide a relatively inexpensive panel to manufacture and assemble having the foregoing properties.

A still further object of our invention is to provide a laminated panel which is relatively lightweight and at the same time capable of use in the construction of fuel tanks that will not rupture instantaneously upon the crash of an aircraft in which they are incorporated.

These and other objects will be more readily understood by reference to the following specification and claims, taken in conjunction with the accompanying drawing, in which FIGURE 1 is a perspective view of a laminated panel constructed in accordance with our invention for use as a bulkhead or other barrier separating the crew's compartment from the passengers' compartment of an aircraft.

FIGURE 2 is a partial vertical cross section taken on line 2—2 of FIGURE 1 showing a combination of different resin impregnated cloth layers formed into a panel embodying our invention.

FIGURE 3 is a diagrammatic showing of glass fiber weave in cloth which is incorporated into our invention and illustrating alternate 90° placement of glass fiber layers on top of each other in accordance with our invention.

FIGURE 4 is a perspective view of a fuel tank formed from laminated nylon sheets impregnated with resin and embodying our invention.

FIGURE 5 is a horizontal cross section showing various layers of resin impregnated nylon cloth incorporated into walls of the tank of FIGURE 4.

In general, the laminated panel that resists ballistic penetration is made up of a plurality of layers of nylon cloth and a plurality of layers of glass fiber cloth, impregnated and bonded together by a polyurethane plastic. The laminated panel used for construction of aircraft fuel tanks is made up only from the nylon cloth layers impregnated and bonded together with a polyurethane plastic.

Although we have tried plastics other than a polyurethane as an impregnating and bonding agent for laminated panels, we have found that other plastics lack the resiliency and strength present in laminated panels made with a polyurethane, so that laminated panels made with such other plastics shatter and fail to resist penetration by bullets of the 44 caliber magnum type. Thus, we have found only the polyurethane type of resin or plastic to have the unusual properties of providing both a bonding means for holding the various cloth layers together as well as producing a significant and unexpected amount of resistance to ballistic penetration in addition thereto.

Suitable polyurethane plastics or resins for use in our invention may be prepared by mixing together a prepolymer and a curing agent. The prepolymer in general consists of an organic diisocyanate condensed with a polyhydric alcohol or with a polyester. For convenience, such an alcohol or polyester will be referred to as a polyol hereafter except when a particular compound is being discussed.

An example of a preferred polyol for use in our invention is an adduct produced by the condensation of polytetramethylene ether glycol and tolylene diisocyanate. Such adducts are referred to commercially as Adiprene polymers. A number of other polyol-diisocyanate combinations condense to form prepolymers also suitable for use in our invention. Such combinations include the following:

| Polyol: | Diisocyanate |
|---|---|
| Polytetramethylene ether glycol | Diphenylmethane diisocyanate. |
| Polytetramethylene ether glycol | m-Phenylene diisocyanate. |
| Polypropylene ether glycol | Tolylene diisocyanate. |
| Polyethylene propylene adipate glycol | Tolylene diisocyanate. |
| Polyethylene propylene adipate glycol | Napthylene-1,5-diisocyanate. |

The Adiprene prepolymers previously mentioned are fully saturated liquid urethane prepolymers. There are two basic types, one is referred to as L-100 and the other as L-167, with the following properties:

| Property | Adiprene L-100 | L-167 |
| --- | --- | --- |
| Specific gravity | 1.06 | 1.06 |
| Viscosity, Brookfield (poise): | | |
| 86° F | 140–190 | 60–80 |
| 77° F | 230–300 | 65–85 |
| Isocyanate content, percent by weight | 4.0–4.3 | 6.2–6.5 |
| Flash point, ° F | 480 | |

In general, a suitable prepolymer for use in our invention may be prepared by condensing any of the previously listed polyols including polytetramethylene glycol with any of the above listed diisocyanates.

Various curing agents may be used with the previously mentioned prepolymers to form the urethane plastic. One suitable curing agent for such prepolymers is 4,4'-methylene-bis-(2-chloroaniline), hereafter referred to for convenience as MOCA. A suitable plastic for use in our invention may be produced by just the combination of any of the previously mentioned prepolymers with MOCA. A preferred combination would include 100 parts by weight of an Adiprene prepolymer with 6 to 15 parts by weight of MOCA. The optimum combination would be 100 parts by weight of Adiprene prepolymer with 11 parts by weight of MOCA.

A preferred quality grade of MOCA has the following properties:

Specific gravity _____ 1.44 solid, 1.26 melted.
Melting range _____ 210–225° F.
Moisture content _____ 0.5% maximum.
Molecular weight _____ 266.

Although MOCA may be used alone as a curing agent with one of the previously mentioned prepolymers, we have found it advantageous to use in addition to MOCA one or more of curing agents such as triethylene diamine, hereafter referred to as DABCO; triethanolamine; a refined castor oil hereafter referred to as DB oil; N,N,N',N' - tetrakis - (2 - hydroxypropyl) - ethylene diamine, hereafter referred to as QUADROL; a mixed polyoxypropylene polyoxyethylene condensation product with ethylene diamine, hereafter referred to as Tetronic 701; trimethylolpropane; and neopentyl glycol azelate, hereafter referred to as NPGA.

The amine type curing agents increase the hardness of urethane plastic or resin. Hardness is affected by the amount of curing agent as well as the particular type used.

Suitable purities of such additional curing agents are as follows, as indicated by the properties of each:

DABCO:
    A white, crystalline solid, melting point, ° F. __ 316
    Molecular weight _____ 112
    Specific gravity _____ 1.14
    Boiling point, ° F. _____ 345
    Moisture content, maximum, percent _____ 1.5
DB oil:
    A hygroscopic liquid, color (Gardner) _____ 1
    Specific gravity _____ 0.96
    Hydroxyl number _____ 165
    Acid number _____ 1
    Saponification value _____ 180
    Iodine number _____ 86
    Viscosity (Gardner-Holt) _____ U+
Triethanolamine, a low viscosity liquid:
    Specific gravity _____ 1.13
    Molecular weight _____ 149
    Melting point, ° F. _____ −7
    Boiling point, ° F. _____ 682

Quadrol, a water white, viscous liquid:
    Molecular weight _____ 292
    Specific gravity _____ 1.03
    Moisture content, maximum, percent _____ 0.05
Tetronic 701:
    Molecular weight, approximately _____ 3400
    Specific gravity _____ 1.02
    Viscosity, centipoise _____ 572
Trimethylolpropane, a white, flaked solid:
    Specific gravity @158° F. _____ 1.09
    Hydroxyl content by weight, minimum, percent _____ 37.5
    Moisture content, maximum, percent _____ 0.05
    Flash point, ° F. _____ 355
NPGA:
    Hydroxyl number _____ 50–58
    Acid number, maximum _____ 2.0
    Moisture content, maximum, percent _____ 0.08

Besides the foregoing, we have found that the hardness of these urethane plastics or resins may be altered by plasticizers of the alkyd type, an example of which is commercially known as Paraplex G-60 and is an alkyd type polymer. It is an amber liquid and has the following properties:

Specific gravity _____ 0.985
Viscosity:
    Gardner-Holt _____ J–O
    Brookfield, cps. _____ 300–500
Acid number, maximum _____ 0.3
Color, maximum _____ 2

Another plasticizer we have used successfully is a partially hydrogenated terphenyl mixture commercially known as HB-40 plasticizer, which is a colorless, oily liquid and has the following properties:

Specific gravity _____ 1.001–1.007
Viscosity:
    SUS @100° F. _____ 124–164
    Brookfield @77° F., centipoise _____ 65–90
Color APHA, maximum _____ 150
Flash point, ° F. _____ 334–356
Moisture content, maximum, percent _____ 0.0125

Our urethane plastic formulations have also included a reactive epoxy flexibilizer commercially referred to as Cardolite NC–513. It is a natural oil extract and has a specific gravity of 0.97, a viscosity of 50 cps., a flash point of 445° F. and an epoxide equivalent of 525.

As an aid to bubble breaking during degassing operations, we have included in our resin formulations a silicone fluid which is commercially known as SF–96 and produced by General Electric.

The following example is a typical preferred formulation of a urethane resin for use in our invention:

EXAMPLE 1

| Material: | Parts by weight |
| --- | --- |
| Adiprene L-167 | 600 |
| Paraplex G-60 | 120 |
| MOCA | 78 |
| BD oil | 60 |
| DABCO | 0.06 |
| SF-96 silicone fluid | 0.01 |

Another suitable formulation is the following:

EXAMPLE 2

| Material: | Parts by weight |
| --- | --- |
| Adiprene L-100 | 600 |
| NPGA | 308.58 |
| MOCA | 30.66 |
| Quadrol | 0.96 |
| SF-96 silicone fluid | 0.01 |

In any of these urethane resin formulations, inert fillers and pigments may be added as desired without affecting the properties of the resin or of the panel laminates.

The urethane resins of Examples 1 and 2 have a hardness of 90 and 50 respectively on the scale known as Shore A hardness. Such hardness may be varied by varying the ingredients in urethane resin formulations. Other physical properties will usually be directly proportional to hardness, such as tensile strength, elongation, and others. In general, softer urethanes are produced when polyols are the curing agents. High molecular weight polyols such as DB oil yield softer formulations than low molecular weight polyols such as trimethylolpropane.

Blending the polyols with amines such as MOCA or triethanolamine increases hardness. Amines alone produce even harder resin formulations. The amount of curing agent, as well as the ratio of ingredients, has an effect on hardness. Plasticizers such as the alkyd type can alter the hardness produced by any curing agent.

The following examples illustrate the alteration of hardness of various urethane resins depending upon the particular formulation used. All hardnesses have been uniformly measured and the results are given as Shore A hardnesses.

EXAMPLE 3

| Material: | Parts by weight |
|---|---|
| A prepolymer resulting from the condensation of polytetramethylene ether glycol and 2,4-tolylene diisocyante, having an isocyanate content of approximately 4% | 63.5–68.5 |
| 4,4'-methylene-bis-(2-chloroaniline) | 3.3–3.6 |
| N,N,N,N' - tetrakis - (2 - hydroxypropyl) ethylene-diamine | 0.6–0.9 |
| Neopentyl glycol azelate | 26.9–32.6 |
| Pigment | 0–0.1 |

The foregoing Example 3 has a Shore A hardness of 50–65.

EXAMPLE 4

| Material: | Parts by weight |
|---|---|
| A prepolymer, resulting from the condensation of polytetramethylene ether glycol and 2,4-tolylene diisocyanate having an isocyanate content of approximately 4% | 48–81 |
| A similar prepolymer containing approximately 6% isocyanate | 0–32 |
| 4,4'-methylene-bis-(2-chloroaniline) | 3.2–6 |
| Triethanolamine | 0.4–1.6 |
| Castor oil | 8.0–15.2 |
| Polymeric plasticizers | 0–4.8 |
| Pigment | 0–0.1 |

The foregoing Example 4 has a Shore A hardness of 60–85.

EXAMPLE 5

| Material: | Parts by weight |
|---|---|
| A prepolymer resulting from the condensation of polytetramethylene ether glycol and 2,4-tolylene diisocyanate having an isocyanate content of approximately 4% | 74.5 |
| 4,4'-methylene-bis-(2-chloroaniline) | 5.8 |
| A mixed polyoxyethylene condensation product with ethylene diamine having only tertiary amines, with a molecular weight of approximately 2,400 | 16.4 |
| Trimethylolpropane | 0.3 |
| A monofunctional epoxy terminated natural oil, having an epoxide equivalent weight of approximately 500 | 1.4 |

The foregoing Example 5 has a Shore A hardness of 80–85.

EXAMPLE 6

| Material: | Parts by weight |
|---|---|
| A prepolymer resulting from the condensation of polytetramethylene ether glycol and 2,4-tolylene diisocyanate having an isocyanate content of approximately 4% | 87–94 |
| 4,4'-methylene-bis-(2-chloroaniline) | 60–13 |

The foregoing Example 6 has a Shore A hardness of 85–90.

EXAMPLE 7

| Material: | Parts by weight |
|---|---|
| A prepolymer resulting from the condensation of polytetramethylene ether glycol and 2,4-tolylene diisocyanate, having an isocyanate content of approximately 6% | 70 |
| 4,4'-methylene-bis-(2-chloroaniline) | 9 |
| Castor oil | 7 |
| Polymeric plasticizer | 14 |

The foregoing Example 7 has a Shore A hardness of 85–90.

EXAMPLE 8

| Material: | Parts by weight |
|---|---|
| A prepolymer resulting from the condensation of polytetramethylene ether glycol and 3,4-tolylene diisocyanate having an isocyanate content of approximately 4% | 84.7 |
| 4,4'-methylene-bis-(2-chloroanaline) | 9.3 |
| Polymeric plasticizer | 6.0 |

The foregoing Example 8 has a Shore A hardness of 90–95.

Any of the foregoing urethane resin formulations may be used in conjunction with layers of nylon cloth and glass fiber cloth to produce laminated panels in accordance with our invention, said layers being first impregnated with the resin. The resin serves both as a bonding agent holding the various layers together, as well as contributing substantially to the ballistic penetration resistant qualities.

A laminated panel embodying our invention and fulfilling the objects of our invention may be constructed by the following method:

EXAMPLE 9

A plurality of layers of nylon cloth and glass fiber cloth first impregnated with a urethane resin, are used to produce laminations making up the panel. A preferable type of glass fiber cloth to be used has a count of 49 x 30 threads per inch, with a warp or straight thread of 225–3/2 denier, and a fill thread of 450–½ denier. Similar types of glass fiber cloth may be used, provided that the warp or straight of the cloth has a majority of the threads.

A preferred type of nylon cloth for use here has a count of 40 x 42 threads per inch and is known as a 2 x 2 basket weave. Other types of nylon cloth with similar properties may also be used.

A plurality of layers of nylon cloth and glass fiber cloth are then impregnated throughout with one of the previously disclosed urethane resins. The method of impregnation is conventional, such as dipping the cloth layers in a solution of the urethane resin diluted with methylene chloride.

After being dipped, the cloth layers are allowed to dry at room temperature for approximately 2½ to 3 hours so that the solvent may evaporate.

Next, a flat surface made of steel or other suitable material is prepared with a release agent over it such as a silicone compound so that the impregnated cloth will not stick thereon. Thereafter, a first layer of impregnated glass fiber cloth is placed flat over the steel surface and cut to the desired size. By use of a squeegee or other device, the glass fiber cloth layer is smoothed out and flattened out by removing all the air in whatever air pockets may be in the layer. After the first layer of glass fiber cloth has been so treated, a second layer of glass fiber cloth, first having been rotated 90° with respect to the first layer, is then placed flat over the first layer and smoothed out in the same manner as the first layer. A third layer of glass fiber cloth is then placed over the second, after first having been rotated 90° with respect to the second layer. The third layer is also smoothed out as the previous layers were. The rotation of 90° in these glass fiber layers is illustrated in FIGURE 3 of the drawings. In this manner, additional layers of glass fiber cloth, each rotated 90° with respect to the previous layer, are placed on top of each layer until there are a total of 12 layers of glass fiber cloth, forming an outer first lamination of the panel, and cut to the desired size.

Next, 8 layers of the urethane resin impregnated nylon cloth are laid over the outer first lamination of the 12 glass fiber layers in the same manner of smoothing out with a squeegee, except that the nylon cloth layers are not rotated in any manner, although they may be so rotated.

In this way, a second or inner lamination of 8 urethane resin impregnated nylon cloth layers is produced for the panel.

After the 8 layers of nylon cloth have been placed in position forming the second lamination, another 8 layers of urethane resin impregnated glass fiber cloth are then placed on top of the second lamination, in the same manner as the first lamination, of layers of glass fiber cloth including the 90° rotation with respect to the preceding layer. These layers of glass fiber cloth form a third lamination comprised of glass fiber cloth.

To form a fourth lamination, eight more layers of urethane resin impregnated nylon cloth are placed over the preceding third lamination, in the same manner as the preceding nylon cloth layers.

Finally, 16 more layers of urethane resin impregnated glass fiber cloth are placed on the preceding fourth lamination to produce a fifth and outer lamination, in the same manner as the first lamination comprised of layers of urethane resin impregnated glass fiber cloth.

The resulting panel has a total of 5 laminations, and a total number of 52 layers of nylon cloth and glass fiber cloth together, although there is more glass fiber cloth than nylon cloth. If inspection shows that substantially all of the air in air pockets of the various layers has been removed so that the layers are all suitably smooth, the resulting composition of matter is left as it is to allow the resin to cure from 8 to 12 hours at room temperature. If the operator making up the panel believes that some air is still there or that the layers are not perfectly flat, then a steel plate may be used to press the various layers together in a conventional manner under a pressure of approximately 10 pounds per square inch.

Curing at room temperature from 8 to 12 hours produces about 50 to 75 percent cure of a laminated panel with 52 layers of cloth.

The resulting laminated panel with 52 layers of cloth as described has a weight of approximately 6.6 pounds per square foot, and is approximately $15/16$ of an inch thick.

For a full and complete cure of the urethane resin, the time required is approximately 5 days at room temperature. If a shorter time is needed, then the panel of 52 layers may be put into an oven or a closed mold for about 16 hours at 180° F. for 100% cure. However, if the 52 layer panel is left overnight to jell, the panel may then be cured for 4 hours at 180° F. and will be cured sufficiently to be sawed up into various sized pieces for incorporation in an airplane bulkhead or door or otherwise.

The foregoing panel has an amount of urethane resin incorporated therein in amounts of 35% by weight.

We have found that the laminated panel in Example 9 will stop, that is, prevent penetration by, a bullet of the 44 caliber magnum type or other hand gun type at distances as close as 4 to 5 feet, when fired at the side of the panel having the 12 layers of glass fiber cloth nearest the firearm ejecting the bullet.

The number of layers of nylon cloth or glass fiber cloth in any or all of the various laminations making up the panel may be varied depending upon the amount of resistance desired to ballistic penetration in proportion to the allowable weight of the panel for the particular application desired.

Nevertheless, the 90° rotation of succeeding layers of resin impregnated glass fiber cloth with respect to the immediately preceding layer of glass fiber cloth is critical to the effectiveness of the panel's resistance to ballistic penetration. The same is true with the requirement that a majority of threads in the glass fiber cloth be uniformly oriented in the warp or straight of the cloth, or in one particular direction.

In the embodiment of our invention applicable to aircraft fuel tanks, we have found that a minimum of three layers of the nylon cloth referred to in Example 9 bonded together with one of our urethane resins previously disclosed, is sufficient to produce an aircraft fuel tank which resists rupture under severe test conditions.

As an example of such resistance to rupture, a model H-34 helicopter was used in a test run of fuel tanks. The helicopter contained 8 conventional and other experimental fuel tanks and 3 fuel tanks each made from 3 layers of nylon cloth bonded together with one of our urethane resins according to our invention. Each tank was located at the bottom of the helicopter fuselage in random order throughout. A football size rock was secured beneath each tank. Each rock was pointed at its top, which was in contact with the bottom of each tank. Each tank was filled with water.

The helicopter, which weighed about 9,000 pounds, was then hoisted by a mobile crane to a height of 30 feet above the ground. The crane then travelled down the runway at a speed of 30 miles per hour. The helicopter was released and allowed to drop to the runway, hitting the ground 30 feet below at over 30 miles per hour. Upon examination of the helicopter and its contents, all 8 of the conventional and other experimental fuel tanks were found to have ruptured. However, none of the 3 fuel tanks embodying our invention had ruptured, but were substantially intact.

The following is an example of a preferred method of construction of an aircraft fuel tank embodying our invention in the form of a 3 layer resin impregnated nylon cloth.

EXAMPLE 10

A minimum of 3 layers of the nylon cloth of Example 9 is impregnated as disclosed in Example 9, with one of our previously disclosed urethane resins. As in Example 9, the layers of urethane resin impregnated nylon cloth are laid, one upon the other, on a steel surface and smoothed out, forming the three layers into a laminated cloth.

The cloth is then placed over two molds previously coated with paraffin or other suitable material to prevent sticking of the resin impregnated cloth. One of such molds is formed into the shape of the upper section and the other into the shape of the lower section of the fuel tank selected. The molds may be made of wood or other suitable material. The laminated cloth is then smoothed around the respective molds and then cut and trimmed to size. If necessary, while on the molds the laminated cloth may be subjected to pressure by covering the cloth with a plastic bag under a vacuum of 25 inches of for about 6 to 8 hours. Thereafter, each laminated fuel tank section is allowed to stand at room temperature for about a week for complete curing.

However, after standing overnight at room temperature, the fuel tank sections may be handled as completely cured pieces and joined together by various methods. We have successfully used a mixture of one of our previously disclosed urethane resins along with about 2% by weight of a colloidally precipitated silica, commercially known as CAB-O-SIL M5 as an adhesive to join the fuel tank sections together.

Various conventional methods may be used in addition, such as riveting and using a bead over the seam joining the upper and lower sections together.

Fuel tanks constructed in accordance with our invention are substantially lighter in weight in comparison to various conventionally constructed fuel tanks having equivalent resistance to rupture. For example, a 300 gallon capacity tank embodying our invention weighs about 35 pounds. In contrast, a conventional tank of equal capacity and resistance to rupture weighs at least 65 pounds. Since weight is at a premium in aircraft, the superiority of fuel tanks embodying our invention is obvious.

About 50 to 70 percent of the weight of our fuel tanks comes from the nylon cloth, the rest being the urethane resin. Such variance is due to the different relative sizes of fuel tanks involved. Increasing the amount of resin over this percentage makes very little difference in resistance to rupture of the fuel tank.

We claim:

1. A relatively lightweight integral laminated panel resistant to ballistic penetration comprising an outer first lamination comprising a plurality of layers of glass fiber cloth, a second lamination comprising a plurality of layers of nylon cloth positioned over said first lamination, a third lamination comprising a plurality of layers of said glass fiber cloth positioned over said second lamination, a fourth lamination comprising a plurality of nylon cloth positioned over said third lamination, and a fifth and outer lamination comprising a plurality of layers of glass cloth positioned over said fourth lamination, said glass fiber cloth having a majority of its fibers uniformly oriented in one direction, alternate layers of said glass fibre cloth in said first, third and fifth laminations being positioned so that a majority of the fibers in said alternate layers extend at an angle of 90 degrees with respect to the majority of the fibers in the preceding layer, said layers and said laminations being impregnated with and bonded together by a urethane resin formed from a prepolymer resulting from the condensation of an organic diisocyanate and a polyol and from a curing agent for said prepolymer.

2. A laminated panel in accordance with claim 1 wherein the organic diisocyanate is tolylene diisocyanate.

3. A laminated panel according to claim 1 in which the polyol is polytetramethylene ether glycol.

4. A laminated panel according to claim 1 in which the curing agent is 4,4'-methylene-bis-(2 chloroaniline).

5. A laminated panel according to claim 1 in which the organic diisocyanate is tolylene diisocyanate, the polyol is polytetramethylene ether glycol, and the curing agent is 4,4'-methylene-bis-(2 chloroaniline).

6. A relatively lightweight integral laminated panel resistant to ballistic penetration comprising a first outer lamination comprising a plurality of layers of glass fiber cloth, a plurality of alternate nylon and glass fiber laminations positioned over said first outer lamination, the first of said alternate laminations comprising a plurality of layers of nylon cloth, the second of said alternate laminations comprising a plurality of layers of fiber glass cloth, the last of said alternate laminations comprising a plurality of layers of glass fiber cloth, the glass cloth in each of said layers of glass fiber cloth having a majority of its fibers uniformly oriented in one direction, alternate layers of said glass fiber cloth in all of said laminations comprising a plurality of layers of glass fiber cloth being positioned so that a majority of the fibers in said alternate layers extend at an angle of 90 degrees with respect to the majority of the fibers in the preceding layer of glass fiber cloth, said layers and said laminations being impregnated with and bonded together by a urethane resin formed from a prepolymer resulting from the condensation of an organic diisocyanate and a polyol and from a curing agent for said prepolymer.

References Cited

UNITED STATES PATENTS

| | | |
|---|---|---|
| 2,417,586 | 3/1947 | Crosley. |
| 2,697,054 | 12/1954 | Dietz et al. |
| 2,968,576 | 1/1961 | Mallonee. |
| 3,127,135 | 3/1964 | Burr et al. _____ 244—126 |

ROBERT F. BURNETT, Primary Examiner

W. A. POWELL, Assistant Examiner

U.S. Cl. X.R.

161—59, 92, 93, 190, 404; 244—121